(12) United States Patent
Bridge, Jr.

(10) Patent No.: US 7,315,958 B1
(45) Date of Patent: Jan. 1, 2008

(54) METHOD AND SYSTEM FOR RESTORING DATA REDUNDANCY IN A STORAGE SYSTEM WITHOUT A HOT STANDBY DISK

(75) Inventor: William Havinden Bridge, Jr., Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 420 days.

(21) Appl. No.: 10/327,208

(22) Filed: Dec. 20, 2002

Related U.S. Application Data

(63) Continuation-in-part of application No. 09/178,387, filed on Oct. 23, 1998, now Pat. No. 6,530,035.

(51) Int. Cl.
*G06F 11/00* (2006.01)

(52) U.S. Cl. .............................................. 714/3; 714/7

(58) Field of Classification Search ...................... 714/3
See application file for complete search history.

(56) References Cited

U.S. PATENT DOCUMENTS

| | | | |
|---|---|---|---|
| 5,155,845 A | | 10/1992 | Beal et al. |
| 5,258,984 A | * | 11/1993 | Menon et al. ................. 714/7 |
| 5,287,459 A | | 2/1994 | Gniewek |
| 5,388,108 A | | 2/1995 | DeMoss et al. |
| 5,469,443 A | | 11/1995 | Saxena |
| 5,485,571 A | * | 1/1996 | Menon ........................... 714/7 |
| 5,524,204 A | | 6/1996 | Verdoorn, Jr. |
| 5,542,065 A | * | 7/1996 | Burkes et al. ............... 711/114 |
| 5,559,764 A | | 9/1996 | Chen et al. |
| 5,574,851 A | | 11/1996 | Rathunde |
| 5,615,352 A | | 3/1997 | Jacobson et al. |
| 5,651,133 A | * | 7/1997 | Burkes et al. ............... 711/114 |
| 5,666,512 A | * | 9/1997 | Nelson et al. ............... 711/114 |
| 5,790,774 A | | 8/1998 | Sarkozy |
| 5,862,158 A | | 1/1999 | Baylor et al. |
| 5,875,456 A | | 2/1999 | Stallmo et al. |
| 5,893,919 A | | 4/1999 | Sarkozy et al. |
| 5,987,566 A | | 11/1999 | Vishlitzky et al. |
| 6,000,010 A | | 12/1999 | Legg |
| 6,035,373 A | | 3/2000 | Iwata |
| 6,047,294 A | | 4/2000 | Deshayes et al. |
| 6,058,454 A | | 5/2000 | Gerlach et al. |
| 6,067,199 A | | 5/2000 | Blumenau |
| 6,092,169 A | | 7/2000 | Murthy et al. |
| 6,138,125 A | | 10/2000 | DeMoss |
| 6,195,761 B1 | | 2/2001 | Kedem |

(Continued)

OTHER PUBLICATIONS

Verita Software Corp., Veritas Volume Manager (VxVM) User's Guide, Release 2.3, 1996.

(Continued)

*Primary Examiner*—Scott Baderman
*Assistant Examiner*—Paul F Contino
(74) *Attorney, Agent, or Firm*—Bingham McCutchen LLP

(57) ABSTRACT

A method and system for restoring data redundancy in a storage system without a hot standby disk is disclosed. Instead of having a hot standby disk, reserve storage space is maintained in a plurality of data storage devices in the storage system. The reserve storage space comprises unallocated storage space in the plurality of data storage devices. Once a data storage device failure is detected, data redundancy is restored on the reserve storage space.

53 Claims, 8 Drawing Sheets

U.S. PATENT DOCUMENTS

| | | |
|---|---|---|
| 6,223,252 B1 | 4/2001 | Bandera et al. |
| 6,233,696 B1 | 5/2001 | Kedem |
| 6,405,284 B1 | 6/2002 | Bridge |
| 6,425,052 B1 * | 7/2002 | Hashemi ............. 711/114 |
| 6,915,448 B2 * | 7/2005 | Murphy et al. ............. 714/6 |
| 2003/0088803 A1 * | 5/2003 | Arnott et al. ............. 714/5 |
| 2006/0277432 A1 * | 12/2006 | Patel et al. ............. 714/6 |

OTHER PUBLICATIONS

Digital Equipment Corp., Logical Storage Manager, Mar. 1996.

Digital Equipment Corp., Introduction to the Logical Storage Manager, Mar. 1996, pp. 1-23.

Digital Equipment Corp., LSM Configurations, Mar. 1996, pp. 1-12.

Digital Equipment Corp., Setting Up LSM, Mar. 1996, pp. 1-11.

Digital Equipment Corp., Encapsulating Existing User Data to LSM Volumes, Mar. 1996, pp. 1-17.

Digital Equipment Corp., LSM Root and Swap Disk Mirroring, Mar. 1996, pp. 1-8.

* cited by examiner

| Disk Drive | Mirror Partners |
|---|---|
| 402 | 408, 416, 424, 426 |
| 404 | 410, 422, 430 |
| 406 | 410, 416, 420, 422 |
| 408 | 402, 416, 422 |
| 410 | 404, 406, 428 |
| 412 | 414, 422, 424, 430 |
| 414 | 412, 420, 426 |
| 416 | 402, 406, 408, 428 |
| 418 | 424, 426, 428 |
| 420 | 406, 414, 430 |
| 422 | 404, 406, 408, 412 |
| 424 | 402, 412, 418 |
| 426 | 402, 414, 418 |
| 428 | 410, 416, 418 |
| 430 | 404, 412, 420 |

METHOD AND SYSTEM FOR RESTORING DATA REDUNDANCY IN A STORAGE SYSTEM WITHOUT A HOT STANDBY DISK

CROSS-REFERENCE TO RELATED APPLICATION

This application is a continuation-in-part of U.S. patent application Ser. No. 09/178,387 (now U.S. Pat. No. 6,530,035), filed on Oct. 23, 1998, entitled "Method and System for Managing Storage Systems Containing Redundancy Data," which is incorporated herein by reference in its entirety.

BACKGROUND AND SUMMARY

Conventional data storage systems include one or more storage devices connected to a controller or manager. As used herein, the term "data storage device" refers to any device or apparatus utilizable for the storage of data, e.g., disk drive. For explanatory purposes only and not as an intent to limit the scope of the invention, the term "disk drive" as used in this document is synonymous with the term "data storage device."

To protect against the loss of data in the event of a disk drive failure, redundant copies of the data may be kept on multiple disks such that if a disk fails, its contents can be reconstructed from the redundant data on the other disks. Traditionally, a service person will physically replace the failed disk with a new one. However, this approach can cause undue delay in the restoration of data redundancy and may lead to the loss of the data entirely. Another common approach is to have a hot standby disk that is not in use, but can be used to automatically replace a disk that fails. The main drawback of having a hot standby disk is that additional idle hardware must be purchased, which is both expensive and inefficient.

A method and system for restoring data redundancy without the use of a hot standby disk is disclosed. Instead of having a hot standby disk, reserve storage space is maintained in the disk drives. In one embodiment, the reserve storage space comprises unallocated storage space on the disk drives. Once a disk drive failure is detected, data redundancy is restored on the reserve storage space.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

FIG. 5 is a table describing mirror partners for disk drives shown in FIG. 4 according to one embodiment of the invention.

DETAILED DESCRIPTION

Restoring data redundancy in a storage system without a hot standby disk is disclosed. Instead of purchasing additional idle hardware, which is both expensive and inefficient, unallocated storage space on disk drives in the storage system is utilized to restore data redundancy, which takes full advantage of existing hardware. Different redundancy methods, such as mirroring or parity protection, may be employed to ensure continued access to data. Mirroring involves the replication of data at two or more separate and distinct disk drives. When parity protection is employed, lost data may be recalculated from the parity piece and the remaining data pieces in the corresponding parity set.

Figure 1:
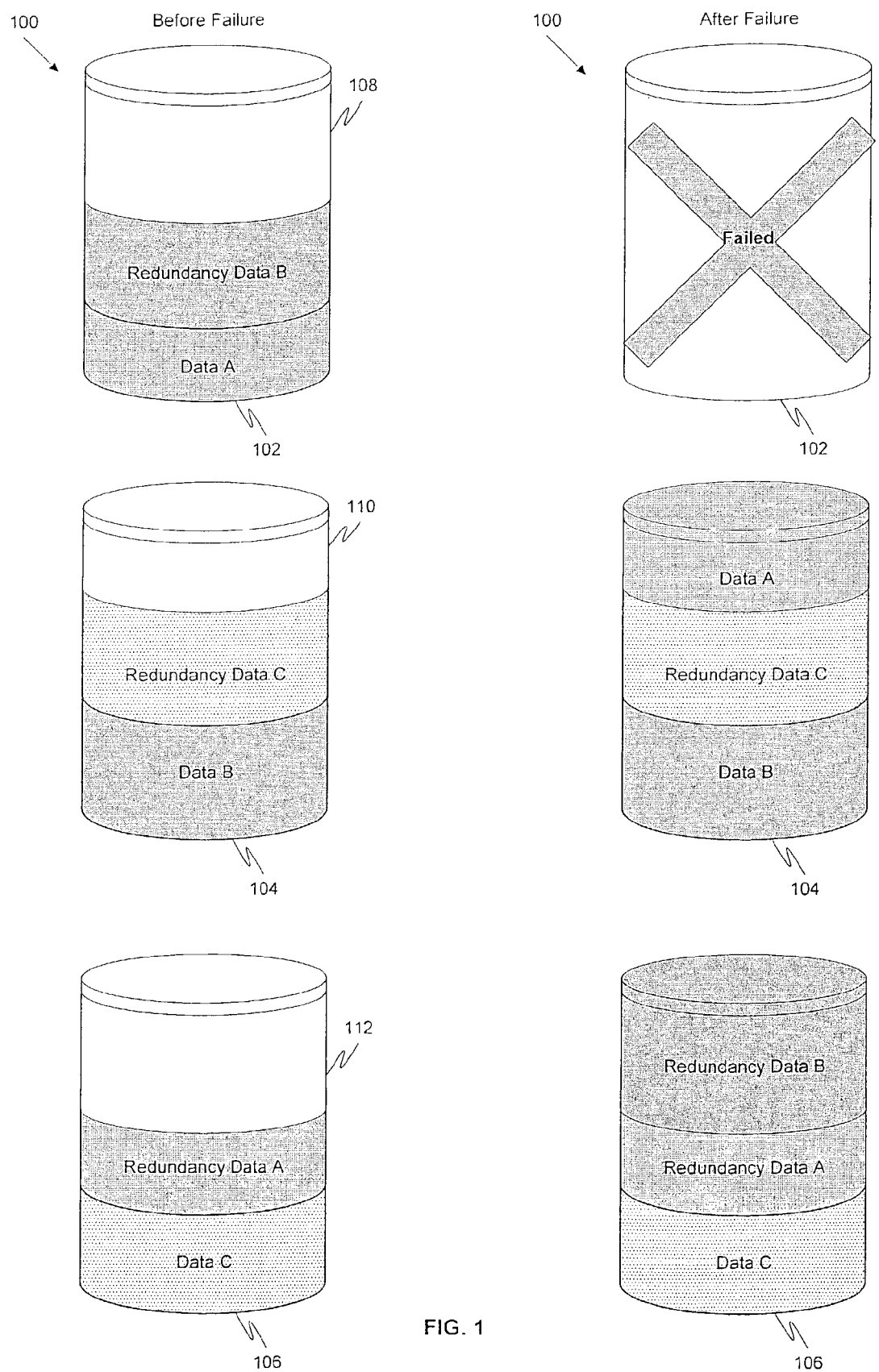
FIG. 1 is a diagram showing restoration of data redundancy after a disk drive failure in which the redundancy data comprises mirrored data according to one embodiment of the invention.

FIG. 1 illustrates a storage system 100 contains disk drives 102, 104, and 106. In the embodiment shown in FIG. 1, storage system 100 is employing the redundancy method of mirroring. As shown in FIG. 1, the data in disk drive 102, Data A, is mirrored on disk drive 106, the data in disk drive 104, Data B, is mirrored on disk drive 102, and the data in disk drive 106, Data C, is mirrored on disk drive 104.

In order to allow for the restoration of data redundancy in the event of a disk drive failure, a reserve storage space is maintained. The reserve storage space in the embodiment shown in FIG. 1 is comprised of unallocated storage spaces 108, 110, and 112 in disk drives 102, 104, and 106, respectively. The amount of reserve storage space to employ is dependent upon a number of factors, e.g., the number of disk drives in the storage system, the redundancy method or methods used, the redundancy factor employed, and the number of disk drive failure recoveries anticipated. FIG. 1 illustrates an embodiment in which the reserve storage space is determined on a per disk basis. As seen in FIG. 1, the reserve storage space need not be equally spread out among all of the disk drives.

Referring to FIG. 1, immediately after disk drive 102 fails, all of the data is still available on disk drives 104 and 106, however, Data A and Data B are no longer protected against another disk drive failure. Thus, it is important to quickly restore data redundancy to minimize the risk of completely losing Data A or Data B. In the embodiment shown, Data A is reconstructed on disk drive 104 and Redundancy Data B is reconstructed on disk drive 106. Thus, none of the data is replicated on the same disk.

Storage systems may associate each disk drive with a failure group. Two disk drives are in the same failure group if they share a common failure condition that is projected to affect both drives at the same time, e.g., they are dependent upon a common piece of hardware which can fail without the entire system failing. In FIG. 1, each disk is, in effect, in its own failure group. Thus, the amount of reserve storage space to employ may also be dependent upon factors such as the number of failure groups in the storage system and the number of disk drives in each failure group.

Figure 2:
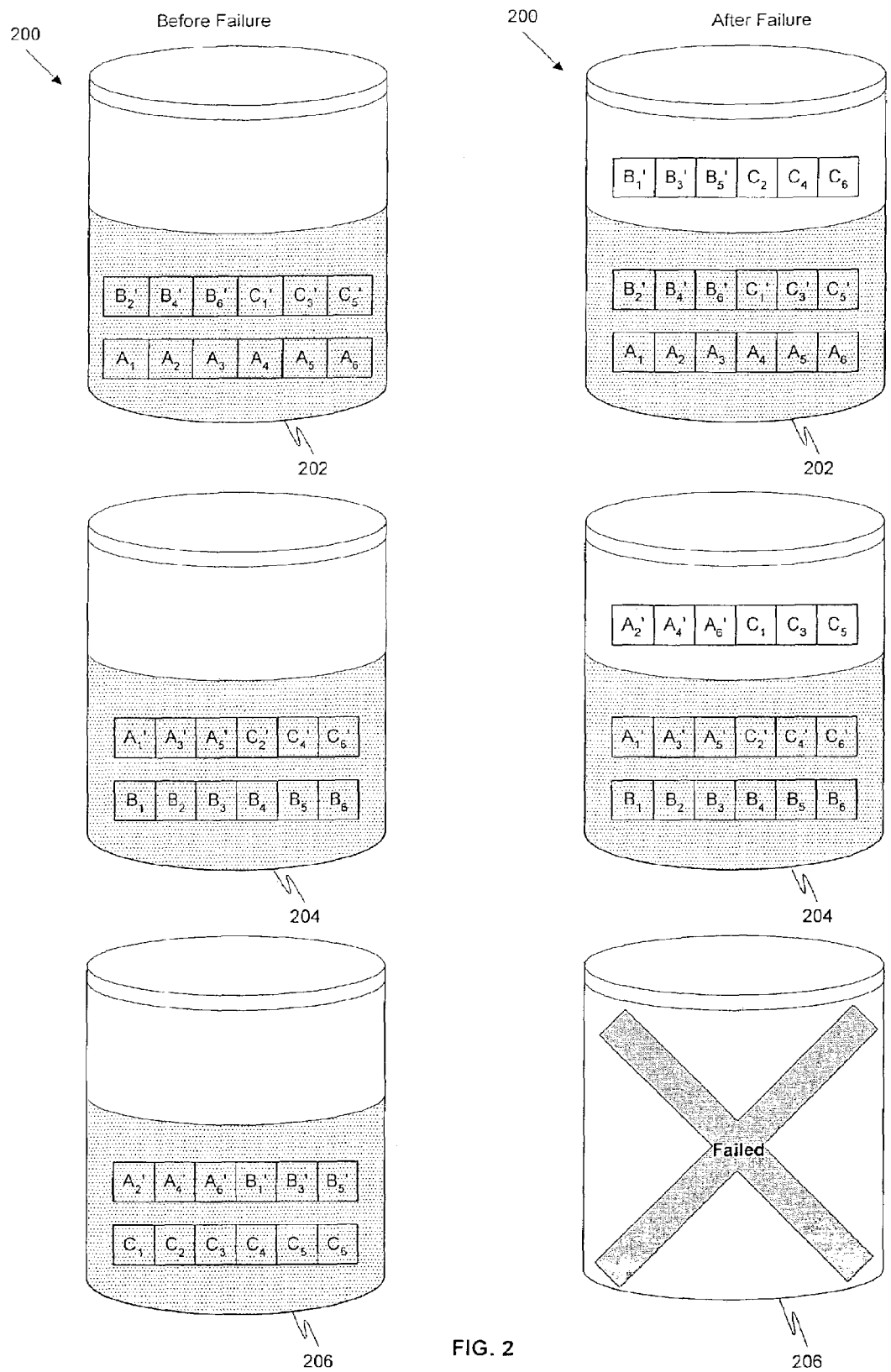
FIG. 2 is a diagram showing restoration of data redundancy after a disk drive failure in which the redundancy data comprises mirrored data at a finer granularity level according to an embodiment of the invention.

Storage system may also mirror at granularities much smaller than the entire disk drive. Referring to FIG. 2, shown is a storage system 200 providing mirroring at the granularity of data extents. Storage system 200 comprises disk drives 202, 204, and 206, each containing an equal unallocated storage space. In the present embodiment, the data in each disk drive is not mirrored solely on one disk drive. For example, data extents $A_1$, $A_3$, and $A_5$ in disk drive 202 are mirrored on disk drive 204 and data extents $A_2$, $A_4$, and $A_6$ are mirrored on disk drive 206. Following failure of disk drive 206, the data extents in that disk are reconstructed on the unallocated storage space of disk drives 202 and 204 such that neither disk drive has more than one copy of a data extent.

Examples of storage systems that utilize failure groups and mirror at a finer granularity are disclosed in co-pending U.S. application Ser. No. 09/178,387 (now U.S. Pat. No. 6,530,035), entitled "Method and System for Managing Storage Systems Containing Redundancy Data," filed on Oct. 23, 1998, and U.S. Pat. No. 6,405,284, entitled "Distributing Data Across Multiple Data Storage Devices in a Data Storage System," issued on Jun. 11, 2002, and both of which are incorporated herein by reference in their entireties.

Figure 3:
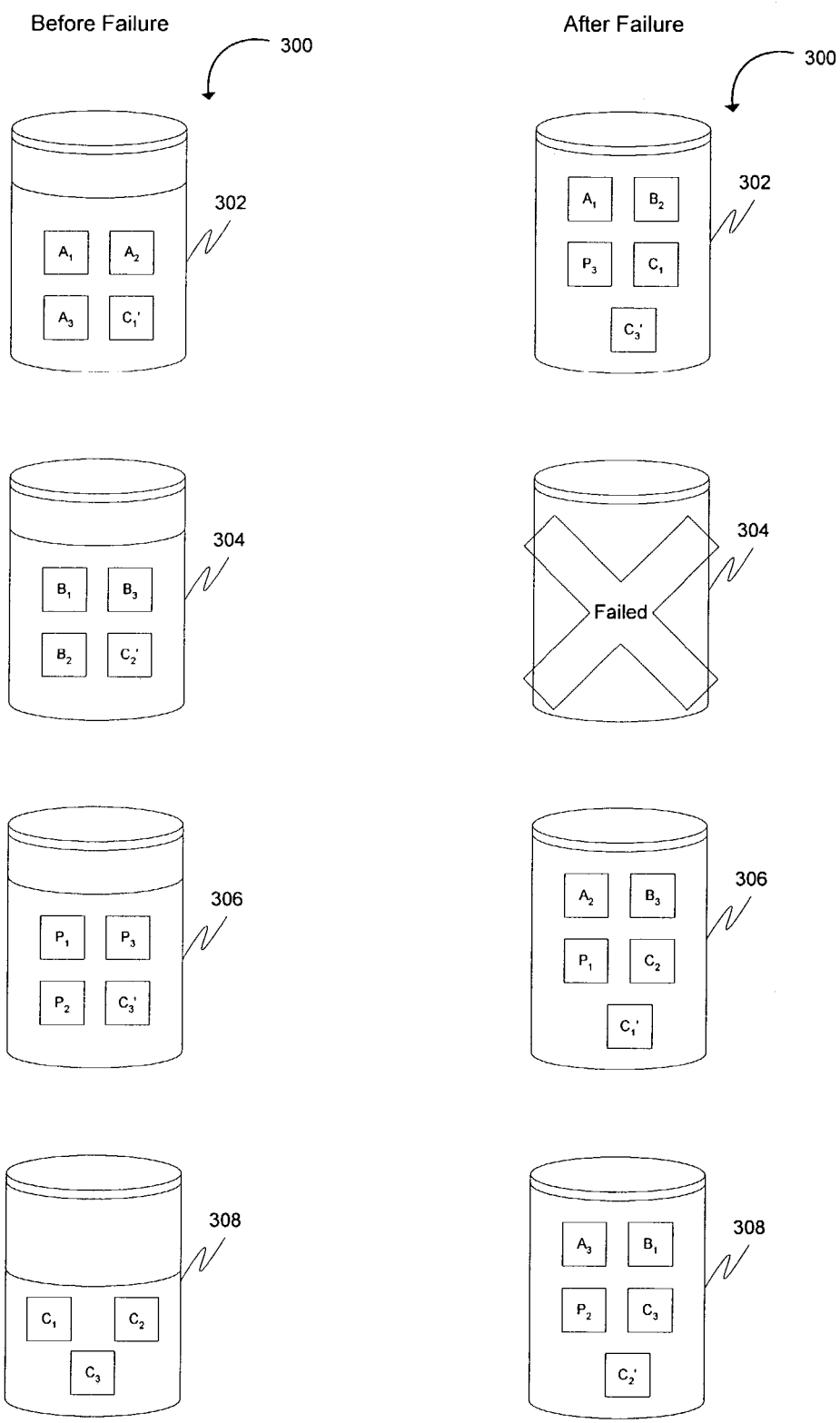
FIG. 3 is a diagram showing restoration of data redundancy after a disk drive failure in which the redundancy data comprises mirrored data and parity information according to one embodiment of the invention.

In FIG. 3, storage system 300 comprises disk drives 302, 304, 306, and 308. To maintain redundancy, storage system 300 employs both mirroring and parity protection at the granularity of data extents. The parity piece in a parity set may contain the exclusive OR of all of the data pieces corresponding to the parity set. Three separate parity sets are shown in FIG. 3: $A_1$, $B_1$, and $P_1$; $A_2$, $B_2$, and $P_2$; and $A_3$, $B_3$, and $P_3$. In this embodiment, the parity extents $P_1$, $P_2$, and $P_3$ are stored in disk drive 306. Also illustrated in FIG. 3 are data extents $C_1$, $C_2$, and $C_3$ in disk drive 308, which are mirrored on the other disk drives in storage system 300.

Upon failure of disk drive 304, data extents $B_1$, $B_2$, and $B_3$, can be reconstructed from the remaining data and parity extents in the corresponding parity set, and a mirror copy of data extent $C_2$ can be reconstructed from the primary copy. However, in this example, the data and parity extents in the surviving disk drives are redistributed prior to restoring data redundancy because merely reconstructing data extents $B_1$, $B_2$, $B_3$, and $C_2'$ on the unallocated storage space in the remaining disk drives may not restore data redundancy as some of the redundant data may be stored on the same disk drive as the primary data. In the embodiment shown, data extents $A_2$ and $A_3$ are reallocated to disk drives 306 and 308, respectively. Parity data extents $P_2$ and $P_3$ are reallocated to disk drives 308 and 302, respectively. Data extent $C_3$ is reallocated to disk drive 302. Data extent $B_1$ is then reconstructed on the unallocated storage space in disk drive 308. Data extent $B_2$ is reconstructed on the unallocated storage space in disk drive 302. Data extents $B_3$ and $C_2'$ are reconstructed on the unallocated storage space in disk drive 306.

Figure 4:
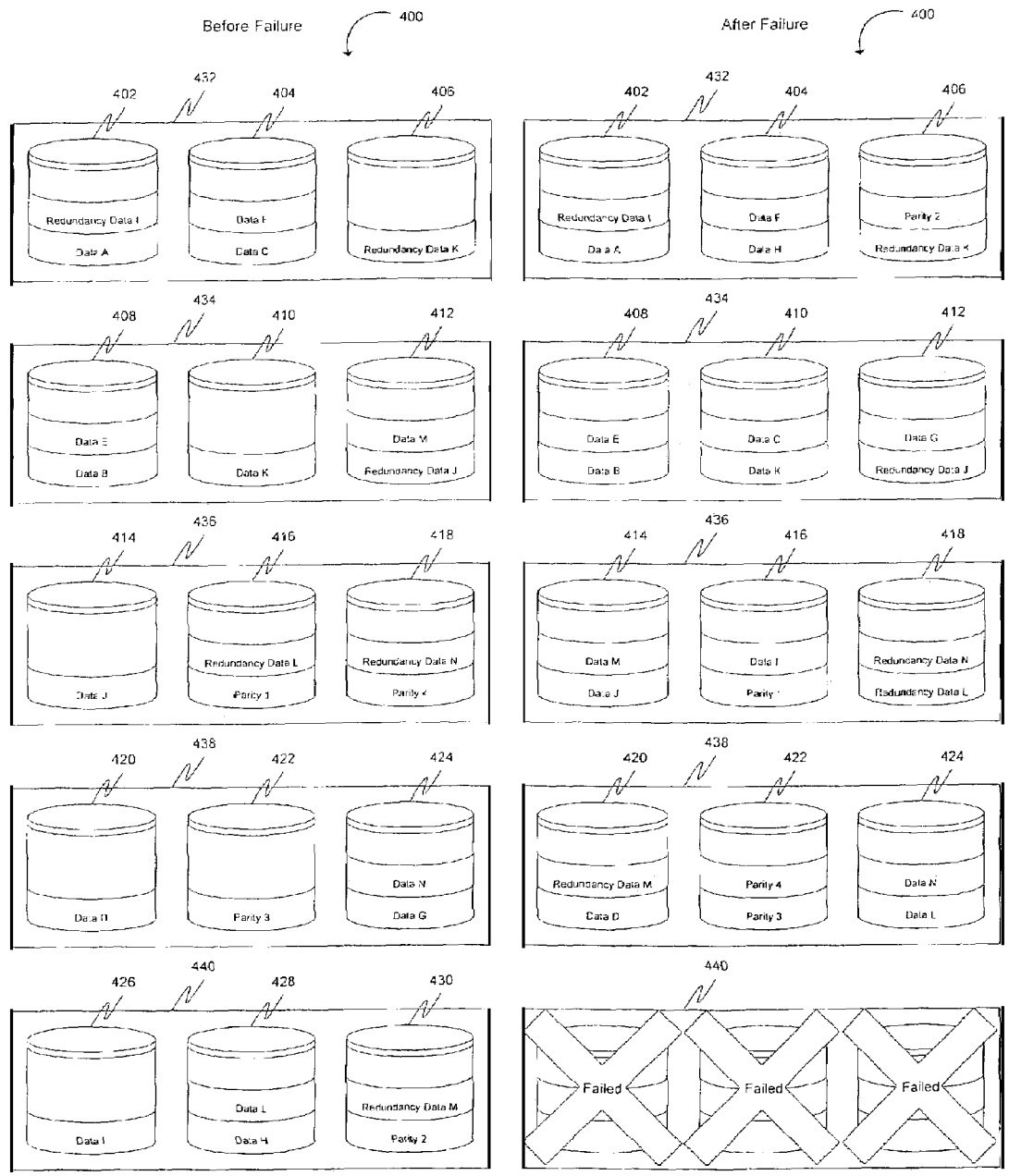
FIG. 4 is a diagram showing restoration of data redundancy after a disk drive failure in which the disk drives are divided into failure groups according to an embodiment of the invention.

FIG. 4 illustrates a storage system 400 with five failure groups 432, 434, 436, 438, and 440, each with three disk drives. Drives in a failure group share some common disk drive failure criteria, which is any failure mode or condition which is projected to cause the related disk drives to fail at the same time period. The projected failure may cause either permanent loss of data or may result in temporary loss of access. For example, disk drives in a failure group may share a common hardware component or may be located in a common geographic location. In one embodiment, allocation of redundancy data to disk drives that are in the same failure group may be avoided.

In one embodiment, mirror partners may be defined to limit the number of disk drives that protect data for redundancy purposes. Each disk drive is associated with one or more mirror partners. In another embodiment, the number of mirror partners for any particular disk drive is limited. Limiting the number of mirror partners for a disk drive reduces the number of disk drives that contain redundant copies of a particular data, thereby reducing the probability of losing the data if a multiple disk drive failure occurs. The number of mirror partners for any particular disk drive can be different from that of other disk drives. In one embodiment, each disk drive is in a different failure group from its mirror partners.

Referring to FIG. 5, shown is a table 500, which describes a mirror partnership configuration for the disk drives depicted in FIG. 4. In one embodiment, the partnership is symmetric, e.g., if disk drive 402 lists disk drive 408 as its partner then disk drive 408 will also list disk drive 402 as a partner. In another embodiment, even if mirror partners are in different failure groups from one another, a disk drive may have multiple mirror partners that are in the same failure group. For example, disk drive 406 may have both disk drives 420 and 422 as mirror partners even though disk drives 420 and 422 are both in failure group 438. In one embodiment, only some of the mirror partners of a disk drive are used for both mirrored and parity protected data. These are called "full mirror partners." Partnerships that are used only for mirroring and not for parity protection are called "mirror only partners." Partnerships that are used only for parity protection and not for mirroring data are called "parity only partners."

Four separate parity sets are illustrated in FIG. 4: Data A, Data B, and Parity 1; Data C, Data D, and Parity 2; Data E, Data F, and Parity 3; and Data G, Data H, and Parity 4. In one embodiment, a parity set is allocated by picking any disk drive as the primary disk to hold the parity piece and then allocating the data pieces in the parity set on its mirror partners. In another embodiment, each piece of data in a parity set is allocated on a mirror partner that is in a different failure group from the other pieces of data in the parity set. Also shown in FIG. 4 are Data I, Data J, Data K, Data L, Data M, and Data N, which are mirrored on various disk drives in storage system 400. The reserve storage space in the embodiment is determined on a per failure group basis rather than on a per disk basis as in the previous embodiments since each failure group comprises a plurality of disk drives.

Disk drives that are listed as a mirror partner of another disk drive may not always be available to be used for mirroring or parity protection. This may occur, for example, if the disk drive selected to store redundancy data (e.g., mirrored data) does not contain sufficient unallocated storage space. If this occurs, then another mirror partner of the disk drive containing the primary data (e.g., the parity data) is selected. In one embodiment, if there is insufficient space on the mirror partners of a disk drive containing the primary data to allocate all of the required redundancy data, then the primary data is deallocated and a new disk drive is selected to allocate the primary data.

As shown in FIG. 4, disk drives 426, 428, and 430 in failure group 440 have all failed. In the embodiment, Parity 4 is deallocated from disk drive 418 in failure group 436 and reallocated to disk drive 422 in failure group 438 because after failure of disk drives 426-430, disk drive 418 has only one available mirror partner remaining, disk drive 424. As a result, Data G is deallocated from disk drive 424 and reallocated to disk drive 412, a mirror partner of disk drive 422, since disk drive 424 is not a mirror partner of disk drive 422 and disk drive 424 is in the same failure group as disk drive 422, where Parity 4 is now stored. Data H is then reconstructed on the unallocated storage space in disk drive 404, anther mirror partner of disk drive 422, using Data G and Parity 4. Factors affecting the determination of where data is reallocated in light of a disk drive failure include, for example, the amount of unallocated storage space on the remaining disk drives, the number of available mirror partners a disk drives has, or the distribution of data.

In order to retain load balancing and to reconstruct Parity 2, Data C is deallocated from disk drive 404 and reallocated to disk drive 410. Parity 2 is then reconstructed on the unallocated storage space in disk drive 406, using Data C and Data D. Disk drives 410 and 420, which contain Data C and Data D, respectively, are mirror partners of disk drive 406. Data M is deallocated from disk drive 412 and reallocated to disk drive 414 to preserve load balancing. Redundancy Data M is then reconstructed on disk drive 420, a mirror partner of disk drive 414. Data I is reconstructed on disk drive 416, another mirror partner of disk drive 402, which contains Redundancy Data I. To maintain load balancing, Redundancy Data L is deallocated from disk drive 416 and reallocated to disk drive 418. Data L is then reconstructed on disk drive 424, a mirror partner of disk drive 418.

Figure 6:
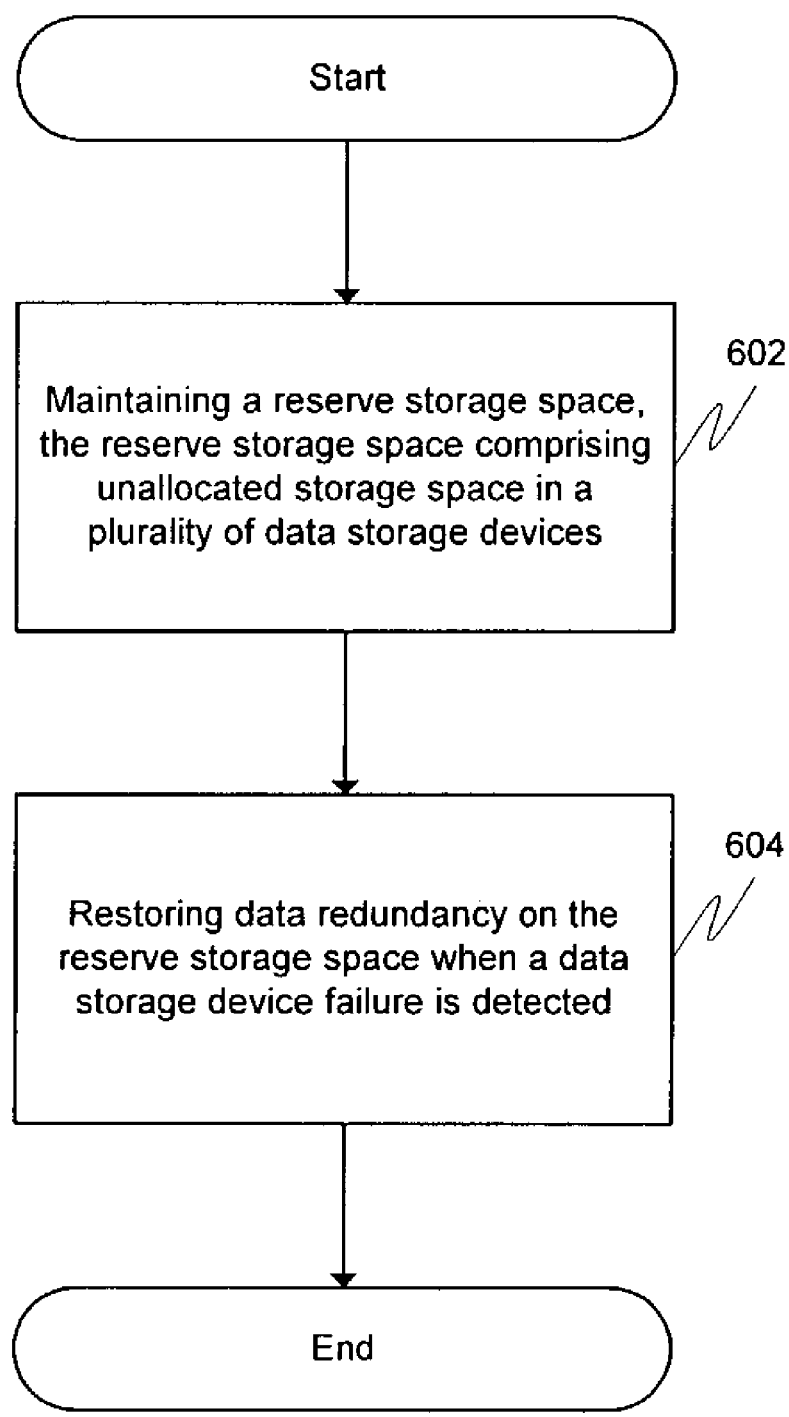
FIG. 6 depicts a high-level process flow chart of an embodiment of the invention.

FIG. 6 depicts a process flow chart of a method for restoring data redundancy in a storage system without a hot standby disk. A reserve storage space that comprises unallocated storage space in data storage devices in the storage system is maintained (602). The reserve storage space may be automatically maintained, i.e., no user intervention required. In one embodiment, the reserve storage space comprises unallocated storage spaces of equal size. Data redundancy is restored on the reserve storage space when a data storage device failure is detected (604). The restoration of data redundancy may be done automatically. In another embodiment, data redundancy may be restored after receiving an initialization signal. The initialization signal may come from the storage system after a timeout or the initialization signal may be the result of a user selection. In one embodiment, redundancy data is not reconstructed on the same disk drive as the primary data.

Figure 7:
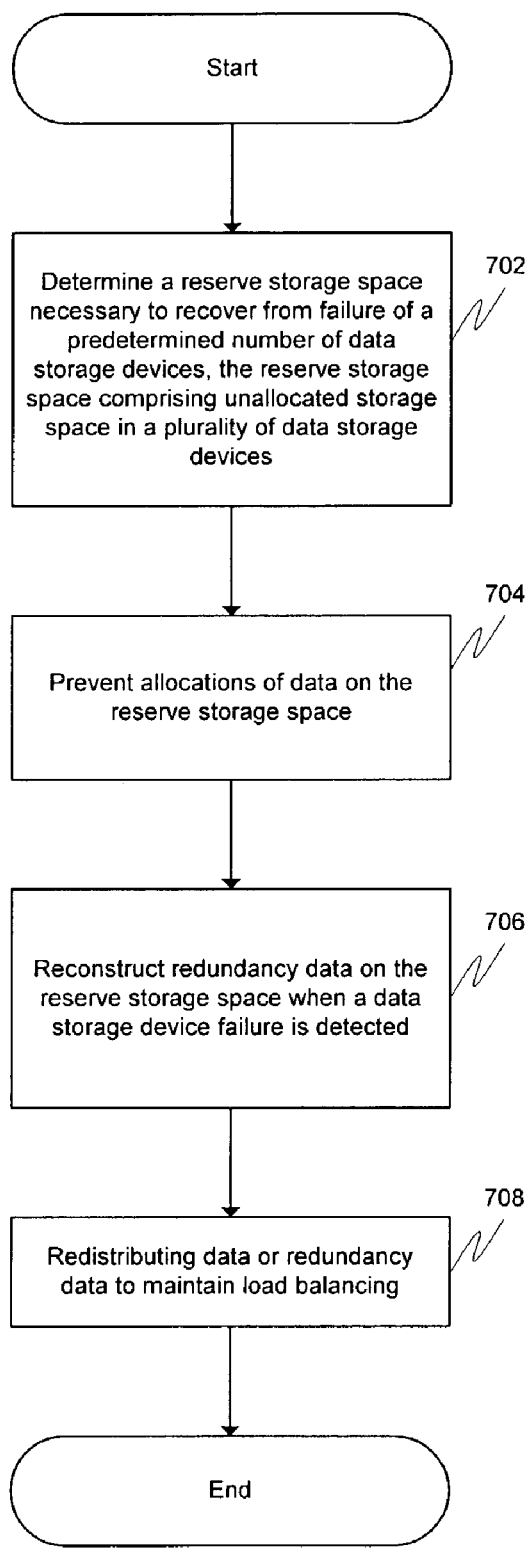
FIG. 7 is a flow diagram showing a process for restoring data redundancy according to one embodiment of the invention.

FIG. 7 is a flow diagram of another method for restoring data redundancy in a storage system without a hot standby disk. A reserve storage space necessary to recover from failure of a predetermined number of data storage devices is determined (702). Determining the reserve storage space necessary may be done automatically. The reserve storage space is comprised of unallocated storage space in data storage devices. Factors affecting the size of the reserve storage space include, for example, the number of failure groups, the number of data storage devices in each failure group, and the redundancy method and factor used. Allocations of data on the reserve storage space is prevented (704). In one embodiment, an allocation limit is set for each data storage device based upon the previously calculated reserve storage space. Redundancy data is reconstructed on the reserve storage space when a data storage device failure is detected (706). Data or redundancy data is redistributed to maintain load balancing (708). In an embodiment, the redundancy data is not reconstructed on a data storage device in the same failure group as the data storage device containing the primary data.

Figure 8:
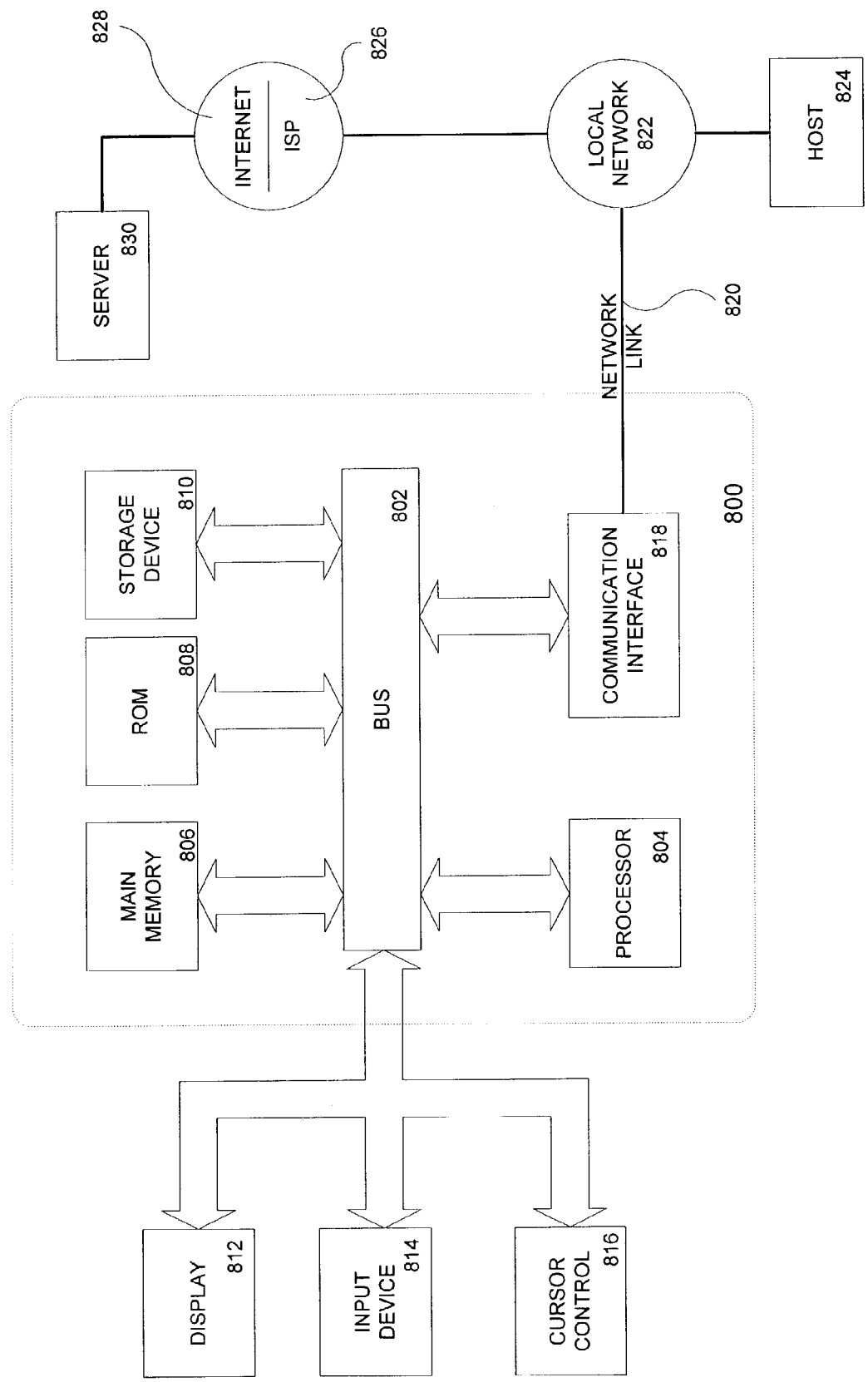
FIG. 8 is a diagram of a computer hardware system with which the present invention can be implemented.

FIG. 8 is a block diagram that illustrates a computer system 800 upon which a method for restoring data redundancy in a storage system without a hot standby disk may be implemented. Computer system 800 includes a bus 802 or other communication mechanisms for communicating information, and a processor 804 couple with bus 802 for processing information. Computer system 800 also includes a main memory 806, such as a random access memory (RAM) or other dynamic storage device, couple to bus 802 for storing information and instructions to be executed by processor 804. Main memory 806 also may be used for storing temporary variables or other intermediate information during execution of instructions to be executed by processor 804. Computer system 800 further includes read only memory (ROM) 808 or other static storage device couple to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

In one embodiment computer system 800 is used to restoring data redundancy in a storage system without a hot standby disk. According to one embodiment, such use is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multiprocessing arrangement may also be employed to execute the sequences of instructions contained in main memory 806. In other embodiments, hard-wired circuitry may be used in place of or in combination with software instructions. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for managing, storing, and retrieving data from a storage system containing multiple data storage devices. The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for restoring data redundancy in a storage system having a plurality of data storage devices, comprising:
   grouping a plurality of data storage devices into a plurality of failure groups, wherein each data storage device in a failure group shares one or more failure criteria;
   determining a reserve storage space based on a per failure group basis;
   maintaining the reserve storage space, the reserve storage space comprising unallocated storage space in one or more of the data storage devices of at least one of the plurality of failure groups; and
   restoring data redundancy on the reserve storage space on a non-ordinal basis when a data storage device failure is detected.

2. The method of claim 1 wherein maintaining the reserve storage space comprises:
   preventing allocations of data on the reserve storage space.

3. The method of claim 1 wherein determining the reserve storage space comprises:
   determining reserve storage space necessary to recover from failure of a predetermined number of data storage devices.

4. The method of claim 1 wherein determining the reserve storage space is done automatically.

5. The method of claim 1 wherein the unallocated storage space in each data storage device is equal.

6. The method of claim 1 wherein restoring data redundancy comprises reconstructing redundancy data on the reserve storage space.

7. The method of claim 6 wherein redundancy data comprises mirrored data.

8. The method of claim 6 wherein redundancy data comprises parity information.

9. The method of claim 6 wherein redundancy data comprises mirrored data and parity information.

10. The method of claim 6 wherein data and its redundancy data are not allocated on one data storage device.

11. The method of claim 6 wherein data and its redundancy data are not allocated on data storage devices in one failure group.

12. The method of claim 6 wherein restoring data redundancy further comprises redistributing data or redundancy data to maintain load balancing between data storage devices.

13. The method of claim 6 wherein each data storage device comprises one or more mirror partners and wherein data is allocated on a data storage device and its redundancy data is allocated on at least one mirror partner of the data storage device.

14. The method of claim 1 wherein maintaining a reserve storage space is done automatically.

15. The method of claim 1 wherein restoring data redundancy is done automatically.

16. The method of claim 1 wherein restoring data redundancy is done after receiving an initialization signal.

17. The method of claim 1, wherein failure criteria comprises at least one failure mode or condition that is projected to cause data storage devices within a failure group to fail at the same time.

18. The method of claim 1, in which the step of restoring data redundancy on the reserve storage further comprises:
allocating a second information from a failed third storage device to a fourth storage device.

19. The method of claim 1, further comprising deallocating a first information from a first storage device in which the deallocating a first information is deemed necessary in order to satisfy one or more requirements of the plurality of failure groups.

20. The method of claim 1, further comprising deallocating a first information from a first storage device in which the deallocating a first information is deemed necessary in order to satisfy one or more requirements of the data redundancy.

21. The method of claim 1, in which the step of restoring data redundancy is performed by deallocating a first information from a first storage device to a second storage device when necessary.

22. A computer program product that includes a computer-usable storage medium having a sequence of instructions which, when executed by a processor, causes the processor to execute a process for restoring data redundancy in a storage system having a plurality of data storage devices, the process comprising:
grouping a plurality of data storage devices into a plurality of failure groups, wherein each data storage device in a failure group shares one or more failure criteria;
determining a reserve storage space based on a per failure group basis;
maintaining the reserve storage space, the reserve storage space comprising unallocated storage space in one or more of the data storage devices of at least one of the plurality of failure groups; and
restoring data redundancy on the reserve storage space on a non-ordinal basis when a data storage device failure is detected.

23. The computer program product of claim 22 wherein maintaining the reserve storage space comprises:
preventing allocations of data on the reserve storage space.

24. The computer program product of claim 22 wherein determining the reserve storage space comprises:
determining the reserve storage space necessary to recover from failure of a predetermined number of data storage devices.

25. The computer program product of claim 22 wherein determining the reserve storage space is done automatically.

26. The computer program product of claim 22 wherein the unallocated storage space in each data storage device is equal.

27. The computer program product of claim 22 wherein restoring data redundancy comprises reconstructing redundancy data on the reserve storage space.

28. The computer program product of claim 27 wherein data and its redundancy data are not allocated on data storage devices in one failure group.

29. The computer program product of claim 27 wherein restoring data redundancy further comprises redistributing data or redundancy data to maintain load balancing between data storage devices.

30. The computer program product of claim 27 wherein each data storage device comprises one or more mirror partners and wherein data is allocated on a data storage device and its redundancy data is allocated on at least one mirror partner of the data storage device.

31. The computer program product of claim 22 wherein restoring data redundancy is done automatically.

32. The computer program product of claim 22 wherein restoring data redundancy is done after receiving an initialization signal.

33. The computer program product of claim 22, wherein failure criteria comprises at least one failure mode or condition that is projected to cause data storage devices within a failure group to fail at the same time.

34. The computer program product of claim 22, in which the process further comprises:
allocating a second information from a failed third storage device to a fourth storage device.

35. The computer program product of claim 22, in which the step of deallocating a first information from a first storage device is deemed necessary in order to satisfy one or more requirements of the plurality of failure groups.

36. The computer program product of claim 22, in which the step of deallocating a first information from a first storage device when necessary, in which the means for deallocating a is deemed necessary in order to satisfy one or more requirements of the data redundancy.

37. The computer program product of claim 22, in which the process comprises the step of restoring data redundancy which is performed by deallocating a first information from a first storage device to a second storage device when necessary.

38. A system for restoring data redundancy in a storage system having a plurality of data storage devices, comprising:
a plurality of data storage devices;
means for grouping the plurality of data storage devices into a plurality of failure groups, wherein each data storage device in a failure group shares one or more failure criteria;
means for determining a reserve storage space based on a per failure group basis;
means for maintaining the reserve storage space, the reserve storage space comprising unallocated storage space in one or more of the data storage devices of at least one of the plurality of failure groups; and
means for restoring data redundancy on the reserve storage space on a non-ordinal basis when a data storage device failure is detected.

39. The system of claim 38 wherein means for maintaining the reserve storage space comprises:
means for preventing allocations of data on the reserve storage space.

40. The system of claim 38 wherein means for determining the reserve storage space comprises:
means for determining the reserve storage space necessary to recover from failure of a predetermined number of data storage devices.

41. The system of claim 38 wherein means for determining the reserve storage space is done automatically.

42. The system of claim 38 wherein the unallocated storage space in each data storage device is equal.

43. The system of claim 38 wherein means for restoring data redundancy comprises means for reconstructing redundancy data on the reserve storage space.

44. The system of claim 43 wherein data and its redundancy data are not allocated on data storage devices in one failure group.

45. The system of claim 43 wherein means for restoring data redundancy further comprises means for redistributing data or redundancy data to maintain load balancing between data storage devices.

46. The system of claim 43 wherein each data storage device comprises one or more mirror partners and wherein data is allocated on a data storage device and its redundancy data is allocated on at least one mirror partner of the data storage device.

47. The system of claim 38 wherein means for restoring data redundancy is done automatically.

48. The system of claim 38 wherein means for restoring data redundancy is done after receiving an initialization signal.

49. The system of claim 38, wherein failure criteria comprises at least one failure mode or condition that is projected to cause data storage devices within a failure group to fail at the same time.

50. The system of claim 38, in which the means for restoring data redundancy further comprises:

means for allocating a second information from a failed third storage device to a fourth storage device.

51. The system of claim 38, further comprising means for deallocating a first information from a first storage device is deemed necessary in order to satisfy one or more requirements of the plurality of failure groups.

52. The system of claim 38, further comprising the means for deallocating a first information from a first storage device when necessary, in which the means for deallocating a is deemed necessary in order to satisfy one or more requirements of the data redundancy.

53. The system of claim 38, further comprising:

means for deallocating a first information from a first storage device to a second storage device when necessary.

* * * * *

UNITED STATES PATENT AND TRADEMARK OFFICE
CERTIFICATE OF CORRECTION

PATENT NO. : 7,315,958 B1
APPLICATION NO. : 10/327208
DATED : January 1, 2008
INVENTOR(S) : Bridge, Jr.

It is certified that error appears in the above-identified patent and that said Letters Patent is hereby corrected as shown below:

In column 3, line 20, after "in" delete "co-pending".

In column 9, line 8, in Claim 19, before "in" insert -- , --.

In column 9, line 13, in Claim 20, before "in" insert -- , --.

In column 10, lines 18-19, in Claim 36, after "device" delete "when necessary, in which the means for deallocating a".

In column 12, line 2, in Claim 51, after "device" insert -- when necessary, in which the means for deallocating a first information --.

In column 12, line 6, in Claim 52, after "comprising" delete "the".

In column 12, line 9, in Claim 52, after "a" insert -- first information --.

Signed and Sealed this

Twenty-first Day of October, 2008

JON W. DUDAS
*Director of the United States Patent and Trademark Office*